(12) United States Patent
Millett

(10) Patent No.: US 11,490,069 B2
(45) Date of Patent: *Nov. 1, 2022

(54) MULTI-DIMENSIONAL DATA CAPTURE OF AN ENVIRONMENT USING PLURAL DEVICES

(71) Applicant: Aemass, Inc., San Francisco, CA (US)

(72) Inventor: Marshall Reed Millett, San Francisco, CA (US)

(73) Assignee: Aemass, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/145,981

(22) Filed: Jan. 11, 2021

(65) Prior Publication Data

US 2021/0136346 A1 May 6, 2021

Related U.S. Application Data

(63) Continuation of application No. 16/362,335, filed on Mar. 22, 2019, now Pat. No. 10,893,257, which is a continuation of application No. 14/878,585, filed on Oct. 8, 2015, now Pat. No. 10,244,228, which is a continuation of application No. 14/022,624, filed on Sep. 10, 2013, now Pat. No. 9,161,019.

(60) Provisional application No. 61/699,223, filed on Sep. 10, 2012.

(51) Int. Cl.
*H04N 13/25* (2018.01)
*H04N 13/271* (2018.01)
*G01S 17/894* (2020.01)
*G01S 17/89* (2020.01)
*G01S 17/06* (2006.01)

(52) U.S. Cl.
CPC ............ *H04N 13/25* (2018.05); *G01S 17/06* (2013.01); *G01S 17/89* (2013.01); *G01S 17/894* (2020.01); *H04N 13/271* (2018.05)

(58) Field of Classification Search
None
See application file for complete search history.

(56) References Cited

U.S. PATENT DOCUMENTS

| | | | | |
|---|---|---|---|---|
| 6,487,303 | B1 * | 11/2002 | Yamaguchi | G06T 7/74 |
| | | | | 382/103 |
| 2005/0216186 | A1 * | 9/2005 | Dorfman | G06F 17/30241 |
| | | | | 701/408 |
| 2012/0230606 | A1 * | 9/2012 | Sugiyama | H04N 1/3876 |
| | | | | 382/284 |

* cited by examiner

*Primary Examiner* — Peter D Le
(74) *Attorney, Agent, or Firm* — Womble Bond Dickinson (US) LLP

(57) ABSTRACT

Embodiments of the invention describe apparatuses, systems, and methods related to data capture of objects and/or an environment. In one embodiment, a user can capture time-indexed three-dimensional (3D) depth data using one or more portable data capture devices that can capture time indexed color images of a scene with depth information and location and orientation data. In addition, the data capture devices may be configured to captured a spherical view of the environment around the data capture device.

20 Claims, 8 Drawing Sheets

MULTI-DIMENSIONAL DATA CAPTURE OF AN ENVIRONMENT USING PLURAL DEVICES

CLAIM OF PRIORITY

This is a continuation of U.S. patent application Ser. No. 16/362,335 filed on Mar. 22, 2019, entitled "Multi-Dimensional Data Capture of an Environment Using Plural Devices," which is a continuation of U.S. patent application Ser. No. 14/878,585 filed on Oct. 8, 2015, entitled "Multi-Dimensional Data Capture of an Environment Using Plural Devices," which is a continuation of U.S. Pat. No. 9,161,019 issued on Oct. 13, 2015, entitled "Multi-Dimensional Data Capture of an Environment Using Plural Devices," which claims priority to Provisional Application No. 61/699,223 filed on Sep. 10, 2012. The disclosures of the aforementioned applications are hereby incorporated by reference in their entity.

TECHNICAL FIELD

This disclosure relates generally to the field of data capture of an environment or object, and in particular, true three dimensional (3D) depth video.

BACKGROUND

Data capture of objects or an environment is used in countless circumstances, and can enable a processor to use, act on, or manipulate the captured data to create an image of the object and/or environment. For example, a camera can capture still two-dimensional (2D) images of a scene, and a video camera can capture video data (i.e., 2D data over time) for later editing and display. Additionally, multiple view stereo 2D images focused around an object can be used to simulate a 3D image of the object. Another example of data capture that can be used to simulate a 3D image involves the use of Light Detection and Ranging (LiDAR) (also known as Laser Detection and Ranging (LADAR)) sensors, which is commonly used for mapping terrain or buildings. LiDAR directs light from a light source at a surface that reflects the light back to a receiver. A LiDAR system will then calculate the distance from the light source to the surface based on the round-trip time of the light (known as "time of flight" (TOF) data). In this way, data regarding distance or depth of objects in an environment can be captured with a LiDAR system. LiDAR systems collect many thousands of data points by fanning or pulsing its beam across an environment and measuring the time-of-flight for each object that reflects the light back to a receiver in the LiDAR system. LiDAR can only determine the depth of objects that reflect light back to the receiver and cannot detect image data pertaining to color. LiDAR and other types of TOF cameras are in a class of camera referred to herein as "depth cameras." Other examples of depth cameras include any device that can determine depth information, such as stereo cameras, structured light scanners, or other devices that emit electromagnetic (EM) radiation and capture the time-of-flight of the radiation reflected back.

Existing technology for capturing imaging data have limitations or drawbacks. For example, current means of 2D documentation media including film, digital photography, and panoramic 2D photography (i.e. cylindrical or cubic interactive panoramas) have limitations in communicating the whole of a real life experience or event when accessed by a user or viewer. 2D images may have excellent resolution and color but have no depth information associated with the images.

Simulated 3D images can be created in various ways. Typically, images are recorded using two spaced-apart lens that record a scene from slightly different angles and these images are provided to a person so that the information is presented to each eye differently such as by use of glasses with color filters or different polarization. As with 2D images, the color and resolution may be excellent and the 3D effects of these stereoscopic images may be compelling, however, such systems still lack the ability to collect depth information of the scene.

The information captured by a depth camera may be combined with the image data of a 2D camera to provide images that simulate 3D and contain depth information. For example a LiDAR image may be combined with data from an overlapping 2D image to simulate a 3D image with depth data—that is, the image data contains information of the distance of objects in the image and has the ability to calculate size and relative spacing of objects in the image.

Current 3D imaging systems, whether stereoscopic cameras or depth cameras combined with 2D cameras, use a single camera that records a single point of view (POV) at a given time to collect data representing a single static moment. Using a single camera can result in gaps in the collected 3D data. For example, a single camera capturing a scene with a tree from a single perspective cannot capture what is behind the tree. Current methods for reducing data gaps when capturing a scene with a single camera require a lengthy process of recording single camera viewpoints, and repositioning the camera multiple times. Once the scene is captured through multiple sessions of repositioning and capturing with the single camera, extensive secondary post-processing is necessary to register the multiple scans and organize the captured data. In addition to requiring large amounts of time (due to, for example, the algorithms used and the large quantities of data), such post-processing generally requires extensive user input and technical knowledge of the user.

In addition to the extensive post-processing required to organize data captured with a these 3D cameras, additional post-processing can be required for rendering the data, including digital graphic interpolation through the construction of a digital model, vectorization, and/or image model building.

Building a data cloud to represent an environment where the depth camera moves requires that the camera have a means to track its movements and location or communicate with a remote means for tracking the camera's movement. This is a common problem in mobile robotics where an environment must be mapped so that the robot can navigate its environment. Similarly, where the data is used to create an immersive environment, the camera must track its location and tag that information to the image data. This technology is generally known as simultaneous localization and mapping (SLAM).

BRIEF DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Figure 1:
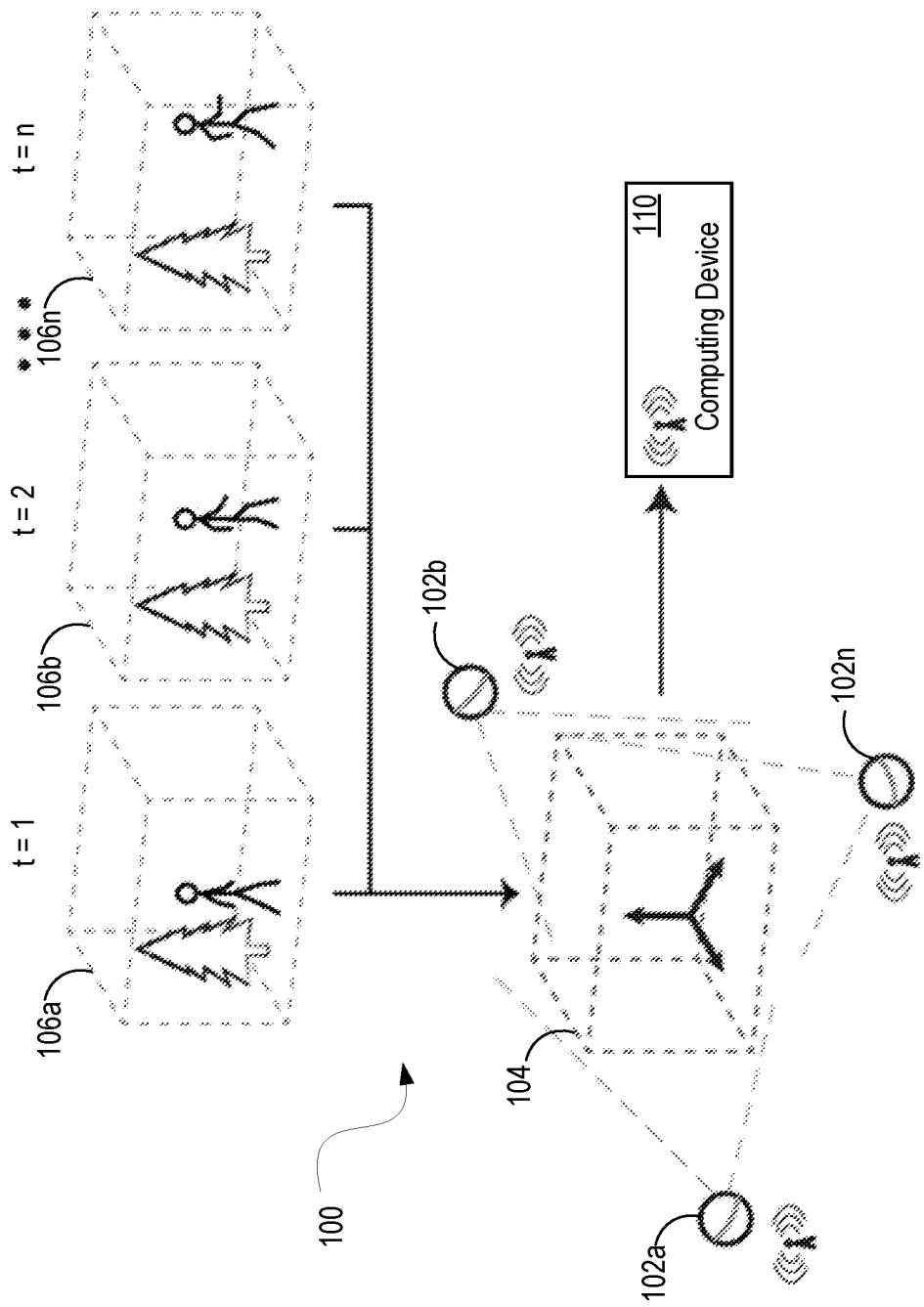
FIG. 1 is a block diagram of a system, according to an embodiment of the invention, and a scene.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of apparatuses, systems, and methods related to data capture of objects and/or an environment are described herein. In one embodiment of the invention, a user can capture true 3D depth video data easily, quickly, and with minimal technical knowledge of the system, wherein 3D depth video data is understood as time-indexed 3D depth data, or four dimensional (4D) time-indexed spatial data. Capturing 3D depth video data enables an immersive and dynamic 3D digital environment, in which a user can explore a 3D environment as it changes in time. A data capture device capable of capturing 3D depth video data can also be referred to as a true 3D depth video camera.

The capturing and visualization of 3D depth video data can enable the concept of retrograde virtual time travel, virtual reality, or augmented reality such that a user can experience and interact with a captured event, environment, or other experience in real-time (e.g., for teleconferences or other real-time interactions) or through stored data. According to one embodiment, a 3D depth video camera system used to capture an environment creates a raw file that is displayable without requiring post-process modeling and/or rendering. A user can capture events for recreation or analysis purposes, including, but not limited to: sporting events, musical concerts, conferences, parties, educational demonstrations, historic events, archeological or cultural heritage sites, hiking trails, mechanical or physical failures, sites under surveillance, or any other environments or events. For example, if a user captures a conference in which multiple presentations are occurring in different parts of a room at the same time, the conference can be digitally displayed such that a user can experience one presentation in one part of the 3D environment, and freely explore the 3D environment by virtually transitioning to the other side of the room to experience another presentation. A second example would be that of a musical performance, wherein the user could experience the event from the position of the audience, the position of being on stage, or from the point of view of one or more of the musicians themselves within the scope of the captured scene.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a block diagram of a system and a scene being captured, according to an embodiment of the invention. As illustrated in FIG. 1, a system 100 includes a plurality of portable data capture devices 102a-102n, situated without a predetermined arrangement and capable of movement during data capture. Other embodiments can include a single portable data capture device. One or more of the plurality of data capture devices 102a-102n are capable of capturing 3D motion. Capturing 3D depth video data involves rapidly capturing a series of 3D measurements and images of an environment and objects within the environment. For example, in the illustrated embodiment, the plurality of data capture devices 102a-102n capture a series of 3D depth data and color image data frames for the 3D environment scene 104 at times t=1, t=2, . . . and t=n.

The scene 104 can include an environment with objects that are stationary and/or moving. For example, the scene 106a-106n includes a moving person. Existing technology capable of capturing 3D data only captures a scene as it exists in a static moment in time. For example, if a user attempted to capture scenes 106a-106n with existing technology, only the stationary elements in the scene could be captured (e.g., a perspective of the tree could be captured, or a person standing still) and any moving objects present at the time of data capture would result in data errors, artifacts or 'ghost' images, and/or incomplete data 'slivers.' System 100 can capture scenes 106a-106n as 3D depth video data, which includes a series of time indexed data collected as 3D frames. Digital visualization of such collected 3D depth video data can enable a truly immersive 3D experience in time, such that the user can experience and explore a 3D environment as it changes across time.

According to one embodiment, the plurality of data capture devices 102a-102n enable accurate capture of time-indexed 3D frames without data gaps or a minimized amount of data gaps. 3D motion can be captured without data gaps due in part to the plurality of data capture devices 102a-102n, which can be positioned to surround the scene 104 and which can simultaneously capture 3D data from a plurality of perspectives. As is described below in more detail, the plurality of data capture devices 102a-102n are capable to collectively capture true 3D spatial data and color images rapidly enough to capture 3D motion and the corresponding colors of the scene 104.

In one such embodiment, the plurality of data capture devices 102a-102n has geospatial data sensing capabilities, which enable improved and real-time data processing (e.g., real-time 3D point cloud generation). Geospatial data is data associated with orientation, position, and/or location of the data capture device. In one embodiment the plurality of data capture devices 102a-102n are capable of communicating with each other and/or with an external computing device 110, also enabling improved and real-time data processing. In one embodiment, the plurality of data capture devices' ability to communicate while capturing data facilitate real-time data discrimination and compression, and therefore enable more efficient and collaborative data capture.

In order to capture the 3D data at a given time, the plurality of data capture devices 102a-102n can utilize any 3D capture technique that enable depth sensing. For example, the plurality of data capture devices can implement one or more of: LiDAR/LADAR, structured light, Flash LiDAR, multiple view stereo digital imagery, panoramic multi stereo digital imagery, photogrammetry, or any other means of capturing 3D data at various fields of depth and resolutions. A user can operate the plurality of data capture devices 102a-102n in portable or fixed arrangements. For example, a user can arrange one or more of the plurality of data capture devices 102a-102n to be stationary by, for example, using tripods, or temporarily or permanently affixing the capture devices to a surface (e.g., a wall, ceiling, tree, or any other surface to which a device can be affixed). In one embodiment, the plurality of data capture devices 102a-102n can be portable. For example, a user can capture data by moving one or more of the plurality of data capture devices 102a-102n while the device is capturing data. Mobile capture of data can enable a user the flexibility of walking with a data capture device to capture scenes of interest.

One or more of the plurality of data capture devices 102a-102n can be attached to autonomous mobile entities (e.g., electronic rotor copters or other vehicles) or user-controlled mobile entities (e.g., hand or remote controlled vehicles, automobiles, video dollies, or other user-controlled entities). In one such embodiment, the system includes a feedback mechanism for controlling the autonomous entity's movements according to the collected data, enabling the data capture device to autonomously fill in data gaps, and/or avoid obstacles. In another embodiment, a user can operate the plurality of data capture devices 102a-102n using a combination of static and dynamic configurations. For example, a user can statically arrange one or more data capture devices, and move around a scene with one or more capture devices while the data is captured.

According to one embodiment, a data capture device can include a protective cover or other padding on part or all of the data capture device in order to protect the device from damage. For example, the exterior of the data capture device can include a damage resistant padding such as rubber, plastic, or foam, which increases durability for dynamic use of the data capture device In one embodiment, each of the plurality of data capture devices 102a-102n is capable of collecting 3D frames at a frame rate adequate for capturing motion. For example, in one such embodiment each of the plurality of data capture devices 102a-102n captures 24 or more 3D frames per second. However, other embodiments may include data capture devices that capture fewer than 24 3D frames per second. The number of frames per second required to capture changes in the 3D environment may depend on a particular environment. For example, in an environment where little motion or change is occurring, fewer frames per minute may be sufficient to capture the motion in the environment. In other environments with frequent or rapid change (e.g., persons or objects in motion), more frames per second or minute may be required to capture 3D depth video data sufficient to enable realistic rendering and scene recreation.

In one embodiment, to capture a sufficient number of frames per minute or second, a 3D depth video capture device can include a plurality of 3D data capturing modules. In one embodiment, a data capture device includes pulse style TOF or Flash LiDAR to capture a sufficient number of 3D frames per second. In one such embodiment, one or more Flash LiDAR modules can include an array of light emitters, which emit light simultaneously to reflect off a target surface and return to an array of corresponding receivers. In another embodiment using LiDAR, the data capture device can include a plurality of modules to enable capturing data in rapid and synchronized succession. For example, modules arranged directly next to each other with overlapping views alternate emission of non-interfering light to produce overlapping motion capture of the 3D scene. In another embodiment, multiple stereo views from digital cameras are used to calculate 3D measurement data by use of or along with supplemented LiDAR or structured light data.

Figure 2:
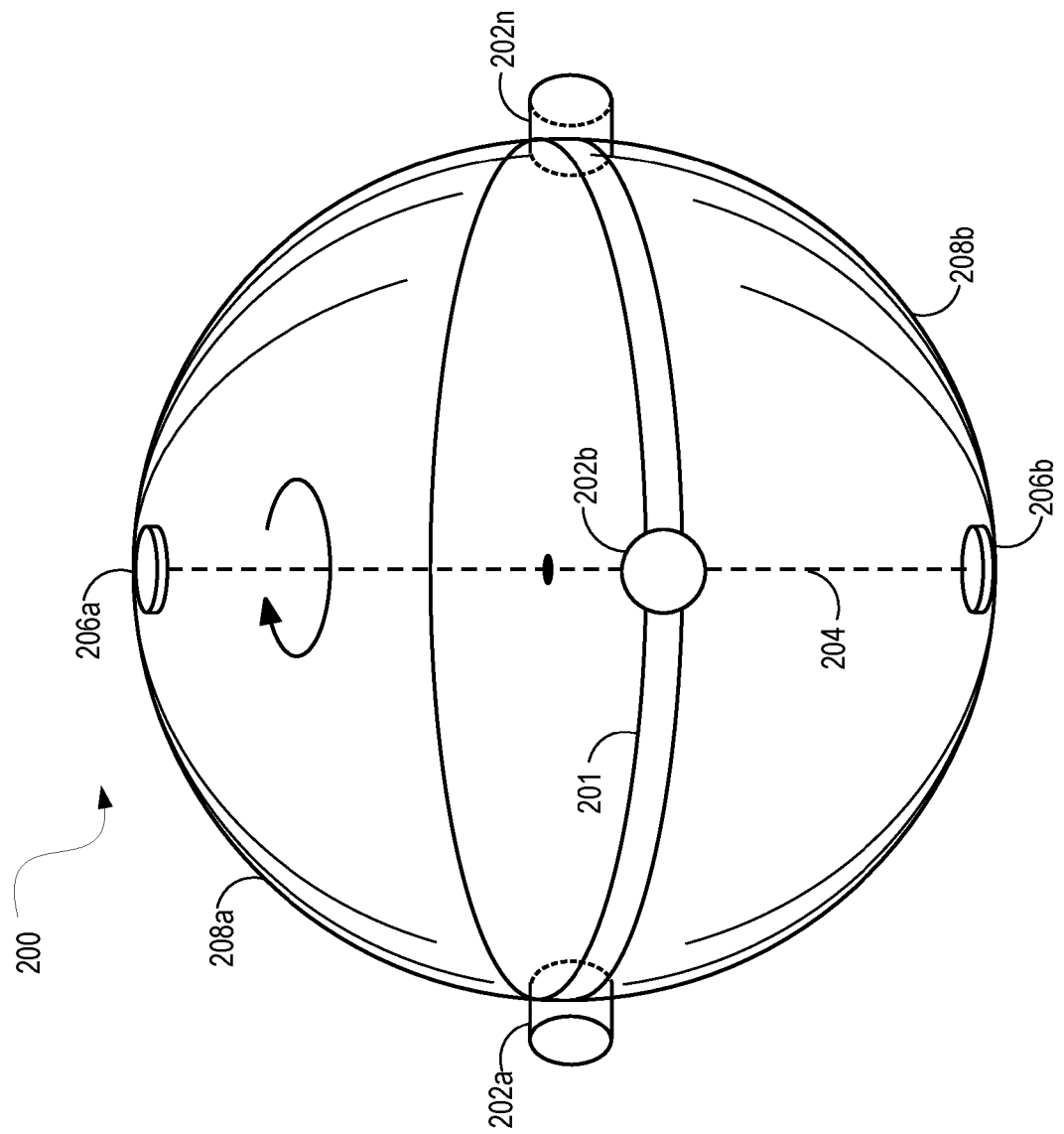
FIG. 2 is an isometric view of a data capture device, according to one embodiment of the invention.

FIG. 2 illustrates an isometric view of a data capture device 200 (e.g., one of the plurality of data capture devices 102a-102n of FIG. 1) including a plurality of depth cameras 202a-202n, according to one embodiment. Data capture device 200 may, as illustrated, have a substantially spherical shape, but other embodiments include other symmetrical and asymmetrical shapes capable of collecting true 3D video data. Device 200 includes a horizontal platform 201 disposed through a center of the device 200 that supports a plurality of depth cameras 202a-202n. Although FIG. 2 illustrates three depth cameras, data capture device 200 can include any number of depth cameras (e.g., 1, 4, 36, 120, etc.). According to one embodiment, a higher number of depth cameras enables an alternating or modulated rate of data capture, which enables the collection of more 3D frames per minute or second. In one such embodiment, the depth cameras can capture at synchronized 'shuttered' ROF. For example, if a single depth camera captures scene data at a rate of 30 frames per second (fps) then three depth cameras can be configured to capture the scene at an effective frame rate of 90 fps by sequencing the image captures. That is, a first camera would capture the scene at a time t=0 s, a second camera would capture the scene at t=1/90 s, and a third camera would capture the scene at t=2/90 s, and etc. so that each camera captures the scene at its 30 fps frame rate and each is time shifted from the other cameras so that a continuous scene capture of 90 fps is achieved by combining the data sets of each camera.

The platform 201 can rotate around axis 204, which enables the depth cameras 202a-202n to capture a portion of, or a complete, spherical solid angle of 360 degrees squared ($4\pi$ steradian) of 3D data. In one such embodiment, the data capture device 200 can also be pivoted and/or moved vertically up and/or down for coverage of a scene, and includes sensors to track movement (e.g., one or more degrees of freedom in 3D space) and orientation (e.g., tilt, pitch, and/or yaw) of each data capture device. In another embodiment described in more detail below, each of the plurality of depth cameras 202a-202n are capable of movement (e.g., pivoting and/or rotation), enabling capture of the scene without movement of the data capture device. The data capture device 200 can also include one or more mechanisms 206a and 206b for mounting the device 200 to a tripod or other surface.

An upper section 208a and a lower section 208b of the data capture device 200 can include means for photographing the environment and for housing electronic controls and data processing. According to one embodiment, one or more image capture modules (not shown) on each of the upper and lower sections 208a-208b are capable of capturing images of up to 180 degrees squared, enabling image capture of an entire surrounding environment. In other embodiments, one or both of the image capture modules on the upper and lower sections 208a-208b are capable of capturing more or less than 180 degrees squared.

The image capture modules can include any image capture means known in the art. For example, the upper and lower sections 208a-208b can include a plurality of digital cameras. In another example, the upper and lower sections 208a-208b can include one or more digital cameras having panoramic lenses. In yet another example, upper and lower sections 208a-208b can include one or more digital cameras having fish eye dome lenses capable of capturing a wide area with a single camera, and/or one or more high definition (HD) video cameras.

The data capture device 200 can include any number of image cameras (e.g., 0, 1, 2, 36, 128, etc.), and any combination of types of cameras. The number of cameras which the data capture device includes can impact the processing necessary to create a single image of the captured environment. For example, a larger number of cameras generating a larger number of separate images typically results in more processing than for a smaller number of cameras due to the number of individual images to be combined. In one embodiment, the upper and lower sections 208a-208b are stationary. In another embodiment, one or both of the upper and lower sections 208a-208b can rotate.

Upper and lower sections 208a-208b can also include one or more depth cameras, or other sensors. Depending on the presence of or configuration of depth cameras on the platform 201, one or more depth cameras can provide redundancy in case of failure of one or more other depth cameras, or for general image alignment purposes. Upper and lower sections 208a-208b or any other section of the data capture device 200 can include other sensors, for example, sensors that sniff the air to determine odors, humidity sensors, temperature sensors, wind sensors, or any other number of sensors for capturing the environment. According to one embodiment, the data capture device 200 includes one or more spectral input scanners, which can provide information regarding chemical spectral analysis of the object or scene being captured.

Figure 3:
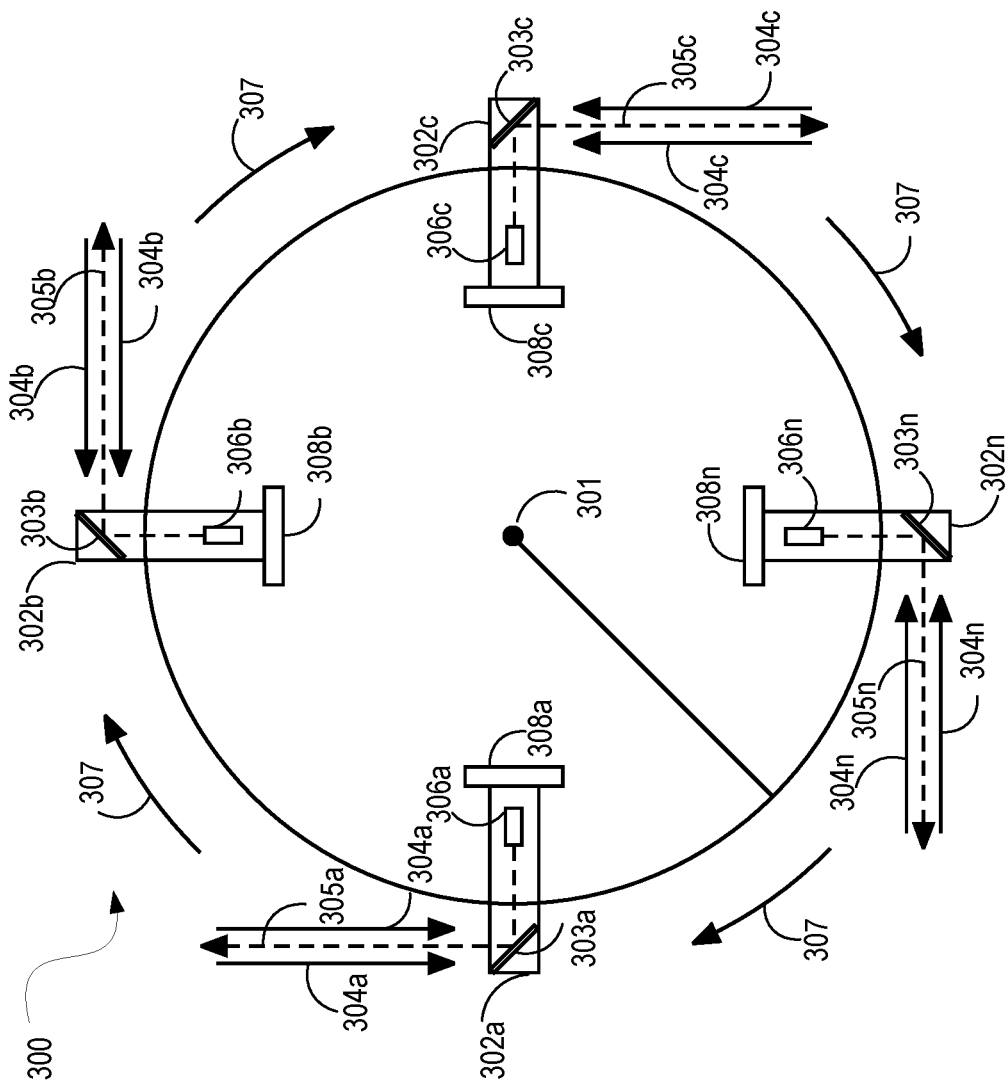
FIG. 3 is a plan view of a platform with a plurality of depth cameras, according to one embodiment of the invention.
Figure 4B:
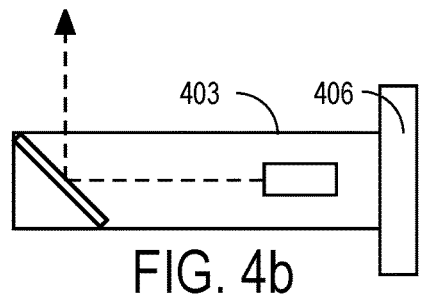
FIGS. 4a-4e illustrate an exemplary diagram of a depth camera, according to one embodiment of the invention using LiDAR.
Figure 4C:
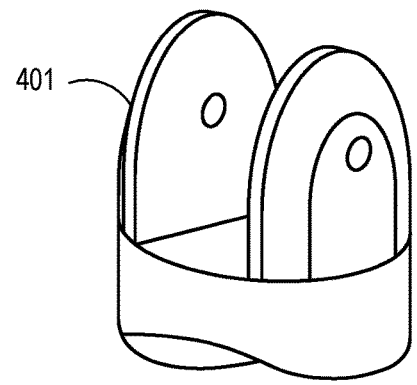
Figure 4D:
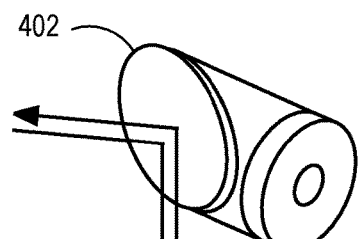
Figure 4A:
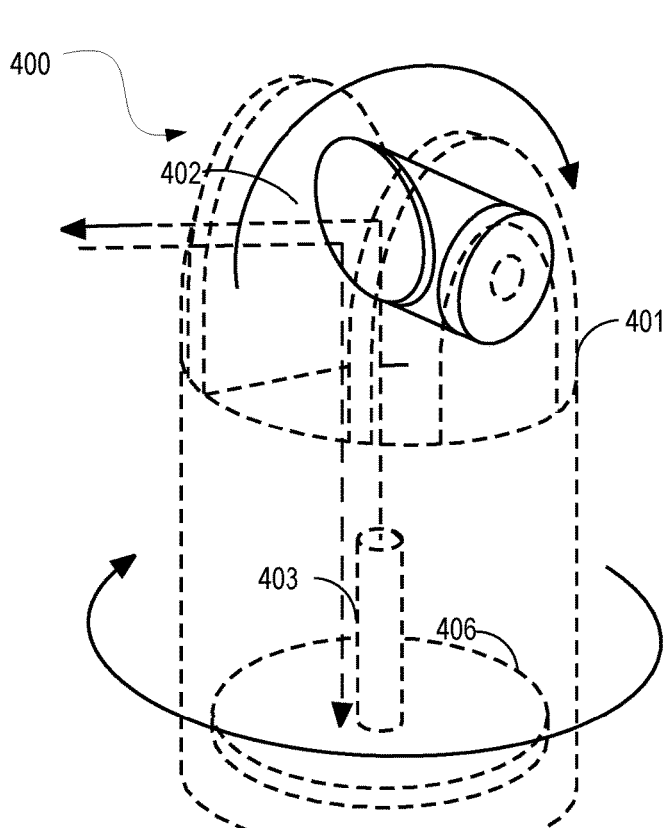
Figure 4E:
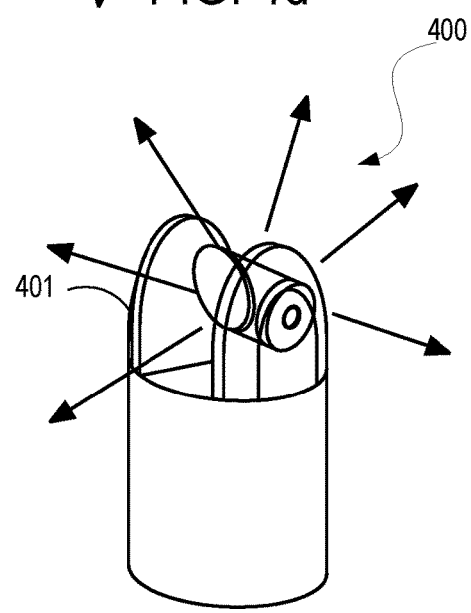

FIG. 3 illustrates a plan view of a platform 300 supporting a plurality of depth cameras 302a-302n, according to one embodiment. As illustrated, platform 300 is disc shaped and rotates around a central axis 301; however, a data capture device can include platforms having other shapes, or entirely different configurations that also enable rapid capture of 3D frames. For example, other embodiments may include one or more rotating platforms in a variety of orientations (e.g., rotation about a vertical or non-vertical axis), or stationary platforms. In one embodiment including a central rotating platform, the platform is symmetrical about a central axis, which can have a benefit of improving balance during rotation when the device is in a level position.

The data capture device can include any type or configuration of depth cameras for capturing 3D data. Where LiDAR is used as the depth camera, LiDAR modules 302a-302n can be configured to emit a laser beam at various angles relative to the data capture device. Although four depth cameras are illustrated, any number of depth cameras (such as LiDAR modules) can be included. As illustrated in FIG. 3, each of depth cameras 302a-302n include lasers 306a-306n to emit light beams 305a-305n, and mirrors 303a-303n to reflect the emitted light beam in a desired direction. Depth cameras 302a-302n can include rotating mirrors to rapidly emit light beams at desired angles, or other mirror configurations can be utilized. Each of depth cameras 302a-302n includes a light detector 308a-308n, which detects incoming light 304a-304n (e.g., laser beams) which have reflected from surfaces and returned to the data capture device.

Depth cameras 302a-302n can be flush with the surface of the data capture device, or be recessed or extend outward from the surface of the device. Depth cameras 302a-302n can be stationary with respect to the platform 300, or can include means of rotation or other movement with respect to the platform 300. For example, FIG. 4 illustrates a LiDAR module in which one or more components are mounted to a rotating and/or pivoting assembly.

FIGS. 4a-4e illustrate an exemplary LiDAR module 400, according to one embodiment of the invention. LiDAR module 400 includes a light emitter 403, mirror 402, and optical receiver 406. In one embodiment, as illustrated, one or more mirrors 402 are mounted to a biaxial clevis fastener 401, which allows the one or more mirrors 402 to pivot and/or rotate. In one such embodiment, the LiDAR module produces a fanning array with its axis at the point around which the one or more mirrors 402 pivots or moves. If a data capture device 200 includes a plurality of LiDAR modules configured like laser fans, each of the modules can be positioned to emit light that will not interfere with the light emitted by other modules. For example, if each of the LiDAR modules 302a-302n of FIG. 3 is configured as a laser fan as illustrated in FIG. 4, each of the LiDAR modules 302a-302n would emit a fan of laser beams outward and along lines tangent to the data capture device. Another such embodiment includes a fan of laser beams outward and non-tangential to the capture device. A mechanism such as the clevis fastener can be used in conjunction with a rotating platform such as in FIG. 3, or can be used independently of a rotating platform. In one embodiment without a rotating platform example, a data capture device can include a plurality of LiDAR modules 404 disposed across the surface of the data capture device that can produce a sweeping light fan or pulse in such a way as to not interfere with signals or receivers of neighboring LiDAR modules 404. In one embodiment, where reflecting light from multiple LiDAR modules is detected by more than one of the LiDAR modules, the system can determine the detected light from LiDAR modules and identify and filter signals from each module.

Figure 5:
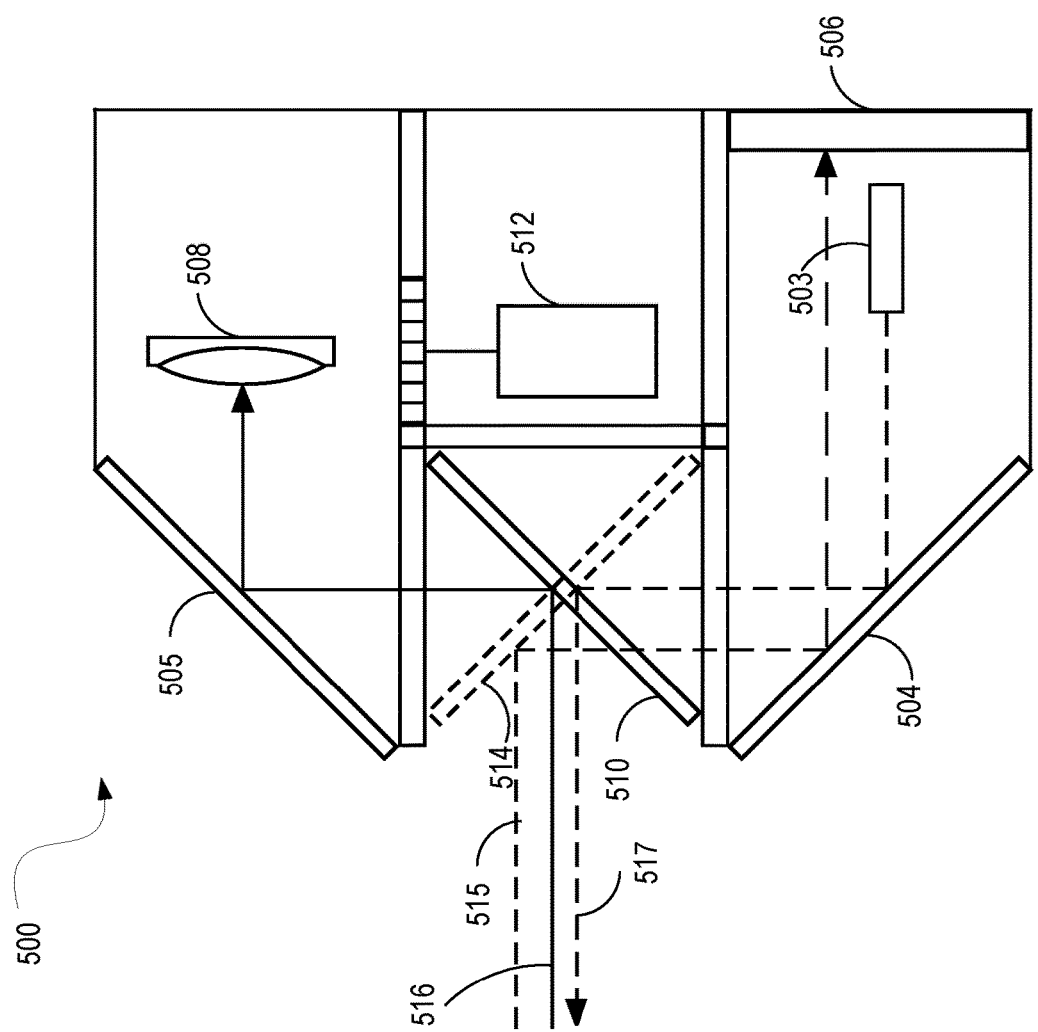
FIG. 5 is an exemplary diagram of a combination depth camera and image camera, according to one embodiment of the invention.

FIG. 5 is an exemplary diagram of a combination depth camera and image camera, according to one embodiment of the invention. Arrangement 500 includes a depth camera for capturing 3D data. An embodiment of the depth camera includes a light emitter 503, a mirror 504, and an optical receiver 506. The light emitter 503 emits light 517, which reflects from mirrors 504 and 510. The emitted light reflects off surfaces of an environment or object and returns as light 516 which enters the combination depth camera and image camera, reflects from the mirrors 510 and 504, and is received by the optical receiver 506. Arrangement 500 also includes an optics device 508 and a mirror 505 for capturing color images. The optics device 508 can include, for example, a digital camera or any other means of capturing the color of a scene. As illustrated, light 516 enters the combination depth camera and image camera, reflects from the mirrors 510 and 505, and is detected by the optics device 508.

Arrangement 500 also includes a rotating dual-sided mirror 510, and a motor 512 to rotate the dual-sided mirror 510. According to one embodiment, the rotating dual-sided mirror enables substantially simultaneous capture of both color and 3D data. For example, when the rotating mirror 510 is in the position as shown, the rotating mirror 510 reflects light for the optics device 508. When the rotating mirror 510 is in the position 514 (represented by dotted lines), the rotating mirror reflects light for the light emitter 503 and the receiver 506. As illustrated, a motor 512 rotates the mirror 510 at a rate (fixed or adjustable) which enables substantially simultaneous capture of 2D color images and depth data without resulting in substantial loss in quality of the captured data (e.g. without resulting in blurring of digital camera images).

Figure 6:
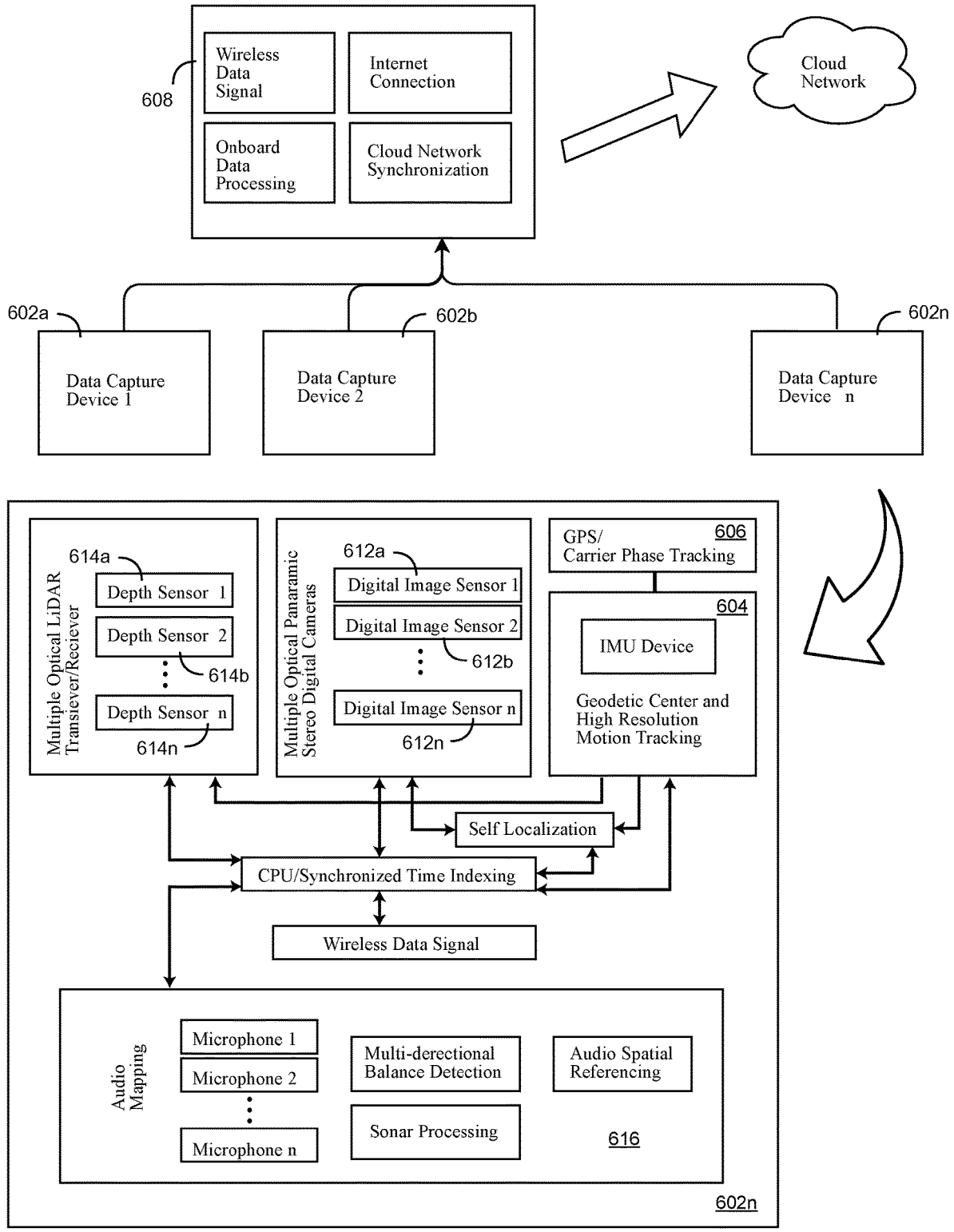
FIG. 6 is a system diagram, according to one embodiment of the invention.

FIG. 6 is a system diagram, according to one embodiment of the invention. The system 600 includes a plurality of data capture devices 602a-602n. Each of the plurality of data capture devices 602a-602n includes one or more depth cameras 614a-614n. In one embodiment, each of the plurality of data capture devices 602a-602n can also include audio mapping module 616, which includes one or more microphones 618a-618n to record sound simultaneously with the 3D and image data.

In one embodiment, each of the plurality of data capture devices 602a-602n is configured with a defined center (e.g., a geodetic datum) and forward orientation and has geospatial location tracking. Geodectic data is defined as exact geographical position (i.e., location in space) and orientation data. For example, the system 600 can monitor each of the data capture device's location and movement in 3D space (e.g., six degrees of freedom). In one such embodiment, the system achieves tracking with micrometer-scale, nanometer-scale, or higher resolution precision of the geodetic data of the data capture device. Where a plurality of data capture devices is used, the system 600 can monitor the location and movement (e.g., linear movements, arcing movements, and rotation) for each the plurality of data capture devices 602a-602n.

In one such embodiment, each of the plurality of data capture devices 602a-602n includes a geodetic center and motion tracking module 604 for tracking movement in 3D space. For example, module 604 can include one or more accelerometers. One such embodiment can include triple or multiple stacked accelerometers. A plurality of accelerometers can be utilized to improve accuracy by averaging or otherwise combining the data and configuring errors from each of the accelerometers. The means for tracking movement in 3D space can include any type of accelerometer or measuring device, including one or more of laser ring gyroscope accelerometers, magnetic sensors with high resolution, inclinometers, and/or any other mechanism for high-accuracy motion sensing. Other embodiments can utilize other means of precise motion tracking in place of, or in addition to, one or more accelerometers. For example, the device utilizes imaging modules to conduct self locolization through use of SLAM. In another example, a data capture device can include tracking of magnetic field fluctuations, and/or inertial measurement units (IMUs) for accurate tracking of the device's motion. As one of the plurality of data capture device 602a-602n moves, the defined center of that device moves with the device according to data collected from the motion sensors. Therefore, a data capture device can be moved from location to location (e.g., carried by a user) while it is recording.

The system 600 keeps track of the movement of the centers (or other preselected loci) of the data capture devices 602a-602n, and calculates how each device's motion impacts the location and orientation of the captured data. In one embodiment, module 604 also includes a vibration sensor to accurately distinguish between vibration and other types of motion. In one embodiment, the precise onboard tracking of the devices geodetic datum is combined with GPS and/or carrier phase tracking module 606, which tracks location data within a geographic coordinate system. Data from the GPS and/or carrier phase tracking module 606 can be supplemented with data from the one or more accelerometers or other motion sensors. For example, if GPS and/or carrier phase tracking data indicate that a logged device center location, as tracked by one or more motion sensors, is incorrect, the device center's location can be updated based on the GPS and/or carrier phase tracking data. According to one embodiment, data from a plurality of sensors including one or more vibration sensors, one or more accelerometers, and one or more GPS and/or carrier phase sensors are analyzed together to reduce error and accurately track motion of each of the plurality of data capture devices 602a-602n.

In one embodiment with geodetic data and motion tracking, each of the plurality of data capture devices 602a-602n begins motion tracking while in a base station. A base station can provide a means of device initialization, and include a mechanism for charging each of the data capture devices 602a-602n and/or a computing device 608. In one embodiment, the base station also houses a central processing unit and includes a display for displaying status information for the data capture devices 602a-602n and/or data received from the data capture devices 602a-602n. In one such embodiment, the display is a touch screen, which both displays information and accepts user input. When each of the plurality of data capture devices 602a-602n begins operation from the base station, each of the devices can be aware of the other devices' locations in relation to each other. Any motion of the plurality of data capture devices 602a-602n from the base station can be sensed by module 604 and/or recorded.

In another embodiment, the plurality of data capture devices 602a-602n can geo-register themselves. For example, if the plurality of data capture devices 602a-602n begin tracking at random locations (e.g., not in a base station), each of the plurality of data capture devices 602a-602n can begin collecting 3D data, and can identify their locations relative to each other once they register the shape of the other data capture devices. Another embodiment incorporates the registered shape of other data capture devices with wireless signals emitted and received from each device. Once the plurality of data capture devices 602a-602n identify their relationship with each other, further registration in post-processing is unnecessary due to motion tracking by module 604.

The monitoring of the geodetic data of the data capture device while it moves through space enables a number of applications. In one embodiment, a data capture device can be used to measure dimensions of an object or area without reliance on traditional measuring techniques. For example, an object or area that is difficult to measure due to size, configuration, or intervening objects, can be measured. A user can start measurement of an object or area with the data capture device at one point, and then walk with the device to a second point that the user wishes to measure. For example, the user can walk from one wall of a room to another wall of the room by taking a direct or indirect path to the other wall, and the system will monitor the data capture device's location, and therefore understand the walls' relationship in space to each other. One or more data capture devices can be used in such a dimension measuring application.

In another embodiment, the monitoring of the geodetic data of each of the data capture devices enables simplified data processing algorithms. The system can understand from which location and perspective each item of data (e.g., a 3D frame or digital image) was captured, and therefore can combine data captured from separate data capture devices without relying on post-processing techniques such as registration or user input. The system can accurately place the data from each data capture device onto a single coordinate system by analyzing the geodetic center of each device when the data was captured to generate a single color 3D frame of an environment. As is described below in greater detail, if each of the data capture devices can communicate with one another and/or with a central computer (e.g., computing device 608), the central computer or one or more of the data capture devices can generate a single 3D data set at one time as the data is captured, and without requiring post-processing.

According to one embodiment, data captured by each of the data capture devices is stored in a format which enables immediate visualization without substantial further processing such as modeling or rendering. For example, the data is stored in a column format of x, y, z, r, g, b, and t to indicate a data point's geospatial location, color values, and time. The column format data is then spatially organized to generate point cloud frames which can be visualized with minimum manipulation of the data.

In another embodiment, the geospatial awareness of a plurality of data capture devices enables real-time feedback regarding potential data gaps. Feedback regarding potential data gaps can be of use for scenarios where the plurality of data capture devices are moving (e.g., due to users carrying or otherwise controlling the devices, or due to mounting on autonomous vehicles). If a user is carrying a data capture device, feedback can be provided via an on-device display, and/or via another computing device (e.g., a smart phone, a tablet, or other external computing device). The feedback regarding data gaps can be a visual representation of the scene as achieved by real-time rendering, or other visual, textual, and/or other indicators (e.g., sounds or vibration of a mobile device indicating a user to collect specific data gaps). If a data capture device is mounted to an autonomous vehicle, the feedback can be provided to direct the vehicle to a location which eliminates or reduces data gaps.

In one embodiment, each of the plurality of data capture devices 602a-602n includes a communication interface 610 to enable wireless communication with each other and/or with a computing device 608. The plurality of data capture devices 602a-602n can also include a means of wired communication with each other and/or computing device 608 (e.g., when devices are located in a base station as described above). The communication interface 610 can include, for example, hardware and/or software for communicating via Wi-Fi (e.g., 802.11 standards), Bluetooth, a cellular data service (e.g., 3G, 4G, or services using other telecommunication standards), satellite, or other means for communication between electronic devices.

The one or more data capture devices can communicate and sync their collected data and/or precise location through wireless signals. A wireless data signal 610 of each of the plurality of data capture devices 602a-602n enables data to be uploaded to each other, the computing device 608, and/or a cloud storage location via a communication interface. According to one embodiment, communication by each of a plurality of data capture devices 602a-602n of its location can create a system of data capture devices which are geospatially aware of one another, and/or include an external computing device (e.g., computing device 608) which is aware of each of the locations of each of the plurality of data capture devices 602a-602n. Such geospatial awareness enables data processing which is simpler, faster, real-time, and requires less user input, according to one embodiment. Additionally, if a data capture device can wirelessly communicate with the computing device 608 or other server, the data capture device can transfer the captured data during its recording session to free up storage space on the data capture device and enable continuous recording. The ability to wirelessly transfer data during a recording session also enables a smaller form factor for ease of portability.

As discussed above, in addition to a 3D data capture means, each of the data capture devices 602a-602n can include one or more image sensors 612a-612n, which capture the color of a scene. In contrast to existing technology, the system 600 can know with high precision where and from what perspective or frame of view the data from a capture device originated, and apply color values or stereo 3D calculations from the captured images to color the 3D data frames and/or supplement 3D data with minimal processing.

According to one embodiment, the images are captured simultaneously with the 3D data to enable generation of color 3D depth video data. In another embodiment, the 3D data capture and color image capture can occur on different schedules. For example, the system 600 can complete an initial 3D and color image scan, and then continue to capture color images and/or 3D data as necessary to capture the desired scene in a given circumstance. In one such embodiment, color images may be captured more frequently than 3D data due to, for example, the 3D environment remaining static. For example, depth data of a wall or surface remains static while lighting conditions that effect the color data, such as a moving shadow, change over time.

In one embodiment, the system 600 performs real-time data discrimination, which can dramatically reduce storage and processing of captured data. The capture of 3D depth video data can produce substantial amounts of recorded data on the order of terabytes (depending on the size of the area captured, the frames per second, and the amount of capturing time). Existing technology can reduce storage requirements after data is recorded using, for example, compression algorithms. However, storing such large amounts of data prior to post-processing can be expensive, time consuming, limit the capabilities of the capture device and require excessive physical storage for the data.

In one embodiment, each of the plurality of data capture devices 602a-602n can include software and/or hardware including electronic controls to determine whether data collected from sensors is static data or dynamic data. Static data is data that is not changing from frame to frame, or data which changes below a threshold value from frame to frame. For example, a 3D data frame which is substantially similar to a subsequent 3D data frame (e.g., within a determined resolution such as from 1.0 to 0.002 cm), the data can be identified as static. Data is dynamic if it is changing from frame to frame, or if data has changes above a threshold value from frame to frame. In one embodiment, the system (onboard the data capture device and/or external to the device) determines a radius threshold in order to discriminate between static and dynamic data. The system identifies dynamic data when it detects changes in the data that are outside the noise radius. In another embodiment, the system uses motion detection or camera imaging to determine static and dynamic data. Once data is identified as being static or dynamic, an algorithm (e.g., a compression algorithm) can be used to selectively discard subsequent static data and record dynamic data real-time, and without requiring resources for post-processing. Real-time data discrimination can be done by a processor on the data capture device, or by a central computer (e.g., computing device 608) to which the data capture device transmits captured data.

In another embodiment in which a plurality of data capture devices are used, the system can utilize data discrimination to identify areas of overlap in which two or more cameras are capturing a particular point of data. In one such embodiment, each of the plurality of data capture devices 602a-602n can communicate with each other and/or the computing device 608, making the system aware real-time of which geographical locations are being recorded by which data capture devices. Once the system identifies an area of overlap, the system (either a data capture device or an external computing device) can cause one data capture device to record the data, and cause the remaining data capture devices to discard the data for that area captured by the other cameras.

In another embodiment of data discrimination in which a plurality of data capture devices is used, the system can identify the density of collected 3D data and perform algorithms which 'thin' the data to have a consistent density, or to be distributed according to a given condition across the collected scene. For example, the system can modify the density of data to result in a lower density for areas of less focus (e.g., areas that are not the primary focus of the data capture such as data at the edges of a captured environment), and a higher density for areas of higher focus. The focus of an area of a captured scene can be determined in any number of ways, including: identifying areas of high focus based on the placement of one or more data capture devices to collect those areas, a rate of change in the area, user input, a combination thereof, or any other method of determining the focus of an area.

One or more of the above-described data discrimination methods can be implemented in a data capture system as described herein. Such real-time data discrimination can enable minimal storage, and faster data processing to generate color true 3D depth video frames.

Figure 7:
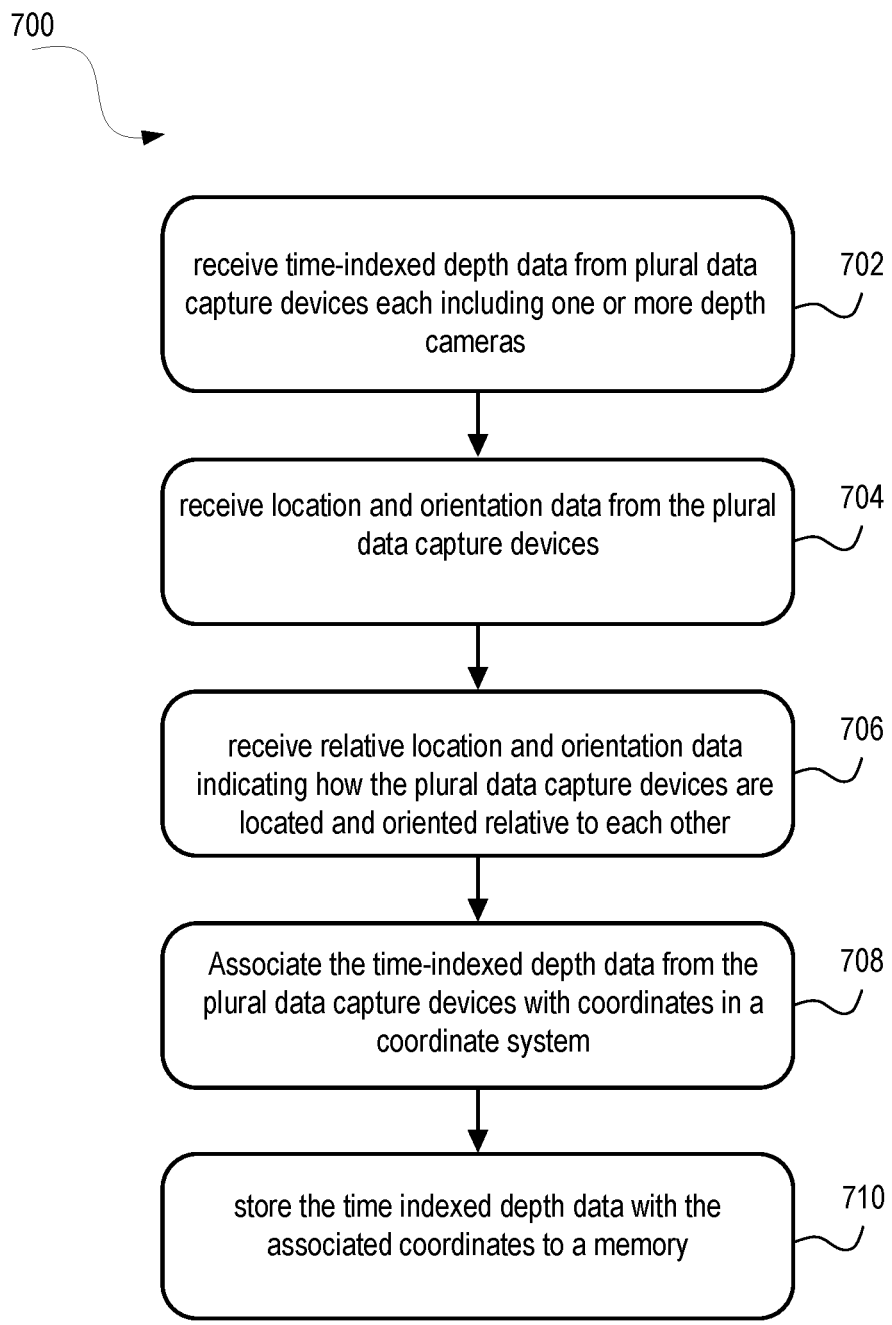
FIG. 7 is a flow diagram of a method of collecting depth and image data of an environment and objects in the environment, according to one embodiment of the invention.

FIG. 7 is a flow diagram of a method of collecting depth and image data of an environment and objects in the environment, according to one embodiment of the invention.

The method 700 begins with operation 702 with a system receiving time-indexed depth data from plural data capture devices each including one or more depth cameras. At operation 704, the system receives location and orientation data from the plural data capture devices. At operation 706, the system receives relative location and orientation data indicating how the plural data capture devices are located and oriented relative to each other. At operation 708, the system associates the time-indexed depth data from the plural data capture devices with coordinates in a coordinate system. At operation 710, the system stores the time indexed depth data with the associated coordinates to a memory.

Figure 8:
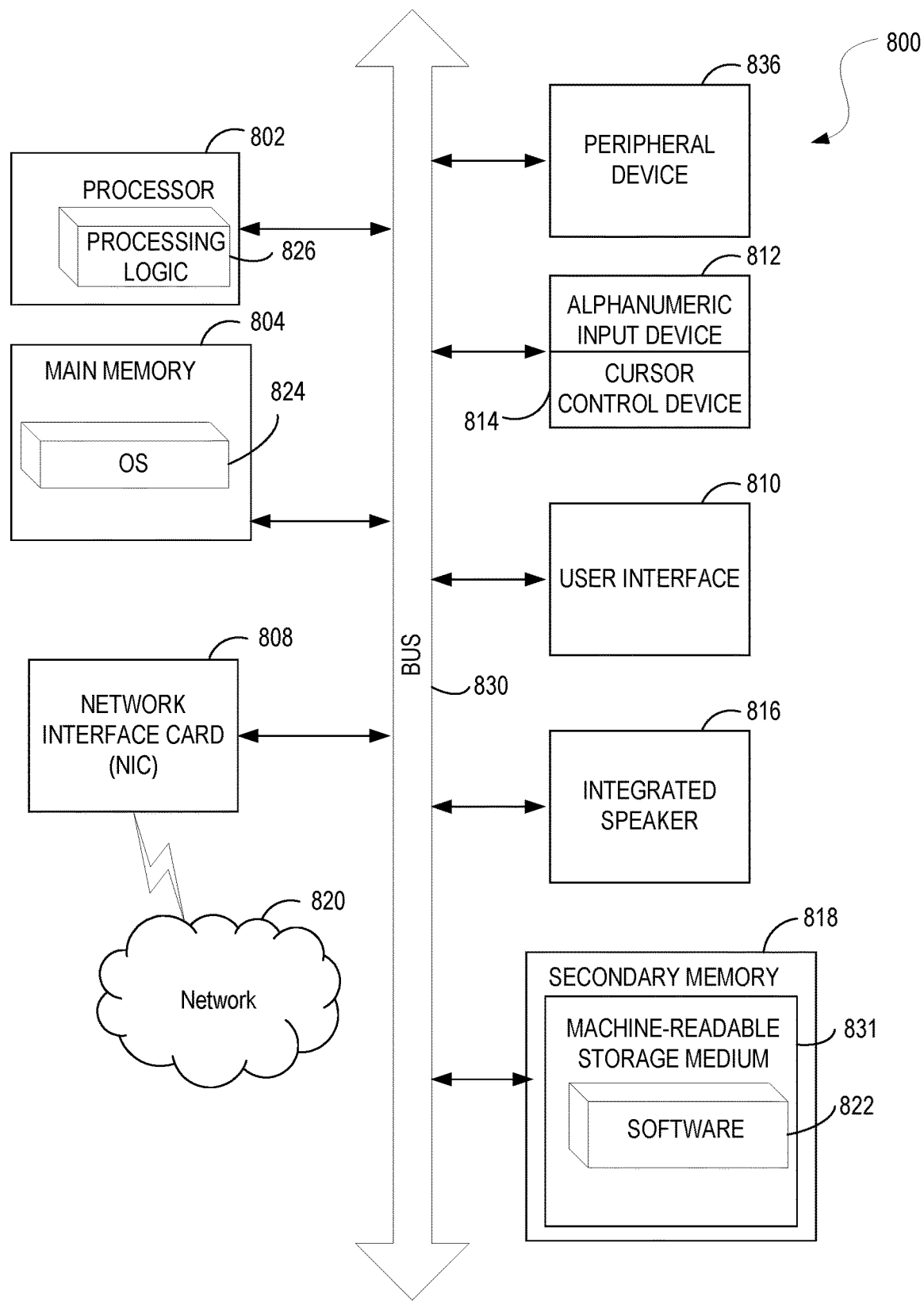
FIG. 8 is a block diagram of a machine in the exemplary form of a computer system, according to one embodiment of the invention.

FIG. 8 is a block diagram of a machine 800 in the exemplary form of a computer system, in accordance with one embodiment, e.g., the processor of computing device 608, within which a set of instructions, for causing the machine 800 to perform any one or more of the methodologies discussed herein may be executed. In alternative embodiments, the machine 800 may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary machine 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives), which communicate with each other via a bus 830. Main memory 804 includes an operating system (OS) 824. According to one embodiment, main memory 804 and OS 824 operate in conjunction with processing logic 826 and processor 802 to perform the methodologies discussed herein.

Processor 802 represents one or more general-purpose processing devices such as a microprocessor, central processing unit, a graphic processing unit, or the like. Processor 802 may also be one or more special-purpose processing devices such as an application specific integrated circuit (ASIC), a field programmable gate array (FPGA), a digital signal processor (DSP), graphics processor, or the like. Processor 802 is configured to execute the processing logic 826 for performing the operations and functionality which is discussed herein.

The machine 800 may further include a network interface card 808. The machine 800 also may include a user interface 810 (such as a video display unit, a liquid crystal display (LCD), or a cathode ray tube (CRT), an alphanumeric input device 812 (e.g., a keyboard), a cursor control device 814 (e.g., a mouse), and a signal generation device 816 (e.g., an integrated speaker). User interface 810 can include a touch screen or other means for a user to interface with the machine 800. The machine 800 may further include peripheral device 836 (e.g., printer, wireless or wired communication devices, memory devices, storage devices, audio processing devices, video processing devices, etc.).

The secondary memory 818 may include a non-transitory machine-readable or computer readable storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the machine 800, the main memory 804 and the processor 802 also constituting machine-readable storage media. The software 822 may further be transmitted or received over a network 820 via the network interface card 808.

Thus, the above description describes multi-dimensional data capture of an environment. Embodiments include a method of collecting depth and image data of an environment and objects in the environment. The method includes receiving first time-indexed depth data from a first data capture device including a first depth camera, the first time-indexed depth data including a first series of distance measurements over a period of time from the first depth camera to first surfaces of an object. The method also includes receiving second time-indexed depth data from a second data capture device including a second depth camera, the second time-indexed depth data including a second series of distance measurements to second surfaces of an object over the period of time from the second depth camera. The method also includes receiving first location and orientation data of the first data capture device during the period of time, the first location and orientation data based on detected motion of a first defined locus and orientation of the first data capture device. The method also includes receiving second location and orientation data of the second data capture device during the period of time, the second location and orientation data based on detected motion of a second defined locus and orientation of the second data capture device. The method also includes receiving relative location and orientation data indicating how the first data capture device and the second data capture device are located and oriented relative to each other. The method also includes associating, based on the first location and orientation data, the second location and orientation data, and the relative location and orientation data, the first time-indexed depth data and the second time-indexed depth data with coordinates in a coordinate system. The method further includes storing, to an electronic memory, time-indexed three dimensional (3D) depth data including the first time-indexed depth data and the second time-indexed depth data with the associated coordinates.

In one such embodiment, the method further includes receiving first color data from the first data capture device of the first surfaces of an object and receiving second color data from the second data capture device of the second surfaces of an object, associating the first and second color data with the first and second time-indexed depth data and with the coordinates in the coordinate system, and storing, to the electronic memory, the first and second color data with the time-indexed 3D depth data and with the associated coordinates.

In one such embodiment, the first and second time-indexed depth data each include distance measurements to surfaces within 4π steradian captured by a plurality of depth cameras. In one embodiment, the first and second location and orientation data each comprise averaged motion data from a plurality of accelerometers. In one embodiment, the relative location data includes first geospatial data from a first GPS indicating a first geospatial location of the first data capture device, and second geospatial data from a second GPS indicating a second geospatial location of the second data capture device. In one embodiment, the relative location data of the first data capture device is based on recognition of a shape of the second data capture device. In one embodiment, the method further includes recognizing a spatial overlap in a portion of the first and second time-indexed depth data, discarding the overlapping portion from one of the first and second time-indexed depth data, and storing, to the electronic memory, the overlapping portion from the other of the first and second time-indexed depth data with the associated coordinates.

One embodiment of the invention includes an apparatus. The apparatus includes one or more depth cameras. Each of the one or more depth cameras capture time-indexed depth data including a series of distance measurements to surfaces of an object over a period of time. The apparatus includes one or more digital image sensors that detect color data of the surfaces of the object. The apparatus further includes one or more sensors that detect motion of a defined locus and orientation of the apparatus over the period of time. The apparatus also includes a self-localization module that receives motion data from the one or more sensors and generates geospatial data including location and orientation data of the one or more depth cameras in a coordinate system over the period of time. The apparatus also includes a communication interface that sends the time-indexed depth data, the color data, and the geospatial data to a computing device. The computing device receives second time-indexed depth data, second color data, and second geospatial data from a second apparatus, and generates time-indexed three dimensional (3D) depth data including the first and second time-indexed depth data and color data and the first and second geospatial data.

In one embodiment, the apparatus includes a plurality of depth cameras that capture 4π steradian depth data per frame of the time-indexed depth data. In one embodiment, the computing device is a device remote from the apparatus. In one embodiment, the apparatus includes the computing device that receives the first and second time-indexed depth data, first and second color data, and first and second geospatial data is comprised in the apparatus, and generates the time-indexed three dimensional (3D) depth data including the first and second time-indexed depth data and color data and the first and second geospatial data. In one embodiment, the one or more sensors that detect motion include a plurality of accelerometers. In one such embodiment, the self-localization module receives the motion data from the plurality of accelerometers, averages the motion data from the plurality of accelerometers, and generates the geospatial data based on averaged motion data. In one embodiment, the plurality of accelerometers includes at least three accelerometers. In one embodiment, the one or more sensors include a vibration sensor.

One embodiment of the invention includes a data capture system for capturing, over time, depth and image data of objects in an environment. The data capture system includes a first data capture device and a second data capture device. The first data capture device includes a first depth camera that records first distance data from the first depth camera to a first surface of one or more objects in the environment and a first image camera that records first image data of the environment and the objects therein and a first sensor that senses first location data. The second data capture device includes a second depth camera that records second distance data from the second depth camera to a second surface of one or more objects in the environment and a second image camera that records second image data of the environment and the objects therein and a second sensor that senses second location data. The data capture system further includes a data processor that receives the first and second distance data, and the first and second image data and the first and second location data and processes the data to create a unified data cloud of the environment and objects therein.

In one embodiment, the first and second image data is grayscale image data. In one embodiment, the first and second image data is color image data. In one embodiment, the first distance data and the first image data are recorded from a first point-of-view (POV) and the second distance data and the second image data are recorded from a second POV, and the data processor creates the unified data cloud such that the environment and objects therein may be viewed from multiple POVs when the data is formatted and viewed.

According to one embodiment, the data processor determines if first and second image data record image data of the same objects in the environment and performs data compression where image data overlaps. In one embodiment, the first and second sensors comprise motion sensors that track relative motion. In one embodiment, the first and second sensors each include plural motion sensors and the location data from the plural motion sensors in each data capture device are averaged to provide greater accuracy of location data. In one embodiment, the first and second sensors further sense orientation of the respective data capture device. In one embodiment, the first depth camera and the second depth camera record sequential first and second depth data respectively at different times so that the system can record data at a data capture rate greater than a maximum data capture rate of the first or second depth camera alone. In one embodiment, the first data capture device further includes a third depth camera and the second data capture device further includes a fourth depth camera. In one such embodiment, the first depth camera and the third depth camera record sequential first and third depth data respectively at different times so that the first data capture device can record data at a data capture rate greater than a maximum data capture rate of the first or third depth camera alone.

In another embodiment, a system includes a communication interface that receives first time-indexed depth data from a first data capture device including a first depth camera, the first time-indexed depth data including a series of distance measurements to first surfaces of an object over a period of time from the first depth camera. The communication interface further receives second time-indexed depth data from a second data capture device including a second depth camera, the second time-indexed depth data including a series of distance measurements to second surfaces of an object over the period of time from the second depth camera. The communication interface further receives first location and orientation data of the first data capture device during the period of time, the first location and orientation data based on detected motion of a first defined center and orientation of the first data capture device. The communication interface further receives second location and orientation data of the second data capture device during the period of time, the second location and orientation data based on detected motion of a second defined center and orientation of the data capture device. The system further includes a data processor that calculates relative location and orientation data indicating how the first data capture device and the second data capture device are located and oriented relative to each other and associates the first time-indexed depth data and the second time-indexed depth data with coordinates in a coordinate system based on the first location and orientation data, the second location and orientation data, and the relative location and orientation data. The system also includes an electronic memory to store time-indexed three dimensional (3D) depth data including the first time-indexed depth data and the second time-indexed depth data with the associated coordinates.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory machine-readable storage medium having one or more instructions stored thereon which, when executed by one or more processors, cause the one or more processors to carry out a method of collecting depth and image data of an environment and objects in the environment, the method comprising:
   receiving first time-indexed depth data from a first data capture device comprising a first depth camera, the first time-indexed depth data comprising a first series of distance measurements over a period of time from the first depth camera to first surfaces of an object;
   receiving second time-indexed depth data from a second data capture device comprising a second depth camera, the second time-indexed depth data comprising a second series of distance measurements to second surfaces of an object over the period of time from the second depth camera;
   receiving first location data of the first data capture device during the period of time;
   receiving second location data of the second data capture device during the period of time;
   receiving relative location data indicating how the first data capture device and the second data capture device are located relative to each other;
   associating, based on the first location data, the second location data, and the relative location data, the first time-indexed depth data and the second time-indexed depth data with coordinates in a coordinate system; and
   storing, to an electronic memory, time-indexed three dimensional (3D) depth data comprising the first time-indexed depth data and the second time-indexed depth data with the associated coordinates.

2. The non-transitory machine-readable storage medium of claim 1, wherein the one or more sequences of instructions cause the one or more processors to carry out the method further comprising:
   receiving first color data from the first data capture device of the first surfaces of an object;
   receiving second color data from the second data capture device of the second surfaces of an object;
   associating the first and second color data with the first and second time-indexed depth data and with the coordinates in the coordinate system;
   storing, to the electronic memory, the first and second color data with the time-indexed 3D depth data and with the associated coordinates.

3. The non-transitory machine-readable storage medium of claim 1, wherein the first and second time-indexed depth data each comprise distance measurements to surfaces within $4\pi$ steradian captured by a plurality of depth cameras.

4. The non-transitory machine-readable storage medium of claim 1, wherein the first and second location and orientation data each comprise averaged motion data from a plurality of accelerometers.

5. The non-transitory machine-readable storage medium of claim 1, wherein the relative location data comprises first geospatial data from a first GPS indicating a first geospatial location of the first data capture device, and second geospatial data from a second GPS indicating a second geospatial location of the second data capture device.

6. The non-transitory machine-readable storage medium of claim 1, wherein the relative location data of the first data capture device is based on recognition of a shape of the second data capture device.

7. The non-transitory machine-readable storage medium of claim 1, wherein the one or more sequences of instructions cause the one or more processors to carry out the method further comprising:
receiving first orientation data of the first data capture device during the period of time, the first location and orientation data based on detected motion of a first defined locus and orientation of the first data capture device; and
receiving second orientation data of the second data capture device during the period of time, the second location and orientation data based on detected motion of a second defined locus and orientation of the second data capture device;
wherein associating the first time-indexed depth data and the second time-indexed depth data with coordinates in a coordinate system is further based on the first and second orientation data.

8. The non-transitory machine-readable storage medium of claim 1, wherein the one or more sequences of instructions cause the one or more processors to carry out the method further comprising:
recognizing a spatial overlap in a portion of the first and second time-indexed depth data;
discarding the overlapping portion from one of the first and second time-indexed depth data; and
storing, to the electronic memory, the overlapping portion from the other of the first and second time-indexed depth data with the associated coordinates.

9. An apparatus comprising:
one or more depth cameras, wherein each of the one or more depth cameras capture time-indexed depth data comprising a series of distance measurements to surfaces of an object over a period of time;
one or more digital image sensors that detect image data of the surfaces of the object;
one or more sensors that detect location of a defined locus of the apparatus over the period of time;
a self-localization module that receives location data from the one or more sensors and generates geospatial data comprising location data of the one or more depth cameras in a coordinate system over the period of time; and
a communication interface that sends the time-indexed depth data, the image data, and the geospatial data to a computing device, wherein the computing device receives second time-indexed depth data, second image data, and second geospatial data from a second apparatus, and generates time-indexed three dimensional (3D) depth data comprising the first and second time-indexed depth data and image data and the first and second geospatial data.

10. The apparatus of claim 9, wherein
the one or more depth cameras comprise a plurality of depth cameras that capture 4π steradian depth data per frame of the time-indexed depth data.

11. The apparatus of claim 9, wherein the computing device is a device remote from the apparatus.

12. The apparatus of claim 9, wherein the apparatus comprises the computing device that receives the first and second time-indexed depth data, first and second color data, and first and second geospatial data is comprised in the apparatus, and generates the time-indexed three dimensional (3D) depth data comprising the first and second time-indexed depth data and color data and the first and second geospatial data.

13. The apparatus of claim 9, wherein the one or more sensors that detect location comprise a plurality of accelerometers to detect motion, and wherein the self-localization module receives motion data from the plurality of accelerometers, averages the motion data from the plurality of accelerometers, and generates the geospatial data based on averaged motion data.

14. The apparatus of claim 13, wherein the one or more sensors further comprise: a vibration sensor, and wherein the plurality of accelerometers comprise at least three accelerometers.

15. A data capture system for capturing, over time, depth and image data of objects in an environment, comprising:
a first data capture device that includes a first depth camera that records first distance data from the first depth camera to a first surface of one or more objects in the environment and a first image camera that records first image data of the environment and the objects therein and a first sensor that senses first location data;
a second data capture device that includes a second depth camera that records second distance data from the second depth camera to a second surface of one or more objects in the environment and a second image camera that records second image data of the environment and the objects therein and a second sensor that senses second location data; and
a data processor that receives the first and second distance data, and the first and second image data and the first and second location data and processes the data to create a unified data cloud of the environment and objects therein.

16. The data capture system of claim 15, wherein the first and second image data is grayscale image data.

17. The data capture system of claim 15, wherein the first and second image data is color image data.

18. The data capture system of claim 15, wherein the first distance data and the first image data are recorded from a first point-of-view (POV) and the second distance data and the second image data are recorded from a second POV and the data processor creates the unified data cloud such that the environment and objects therein may be viewed from multiple POVs when the data is formatted and viewed.

19. The data capture system of claim 15, wherein the data processor determines if first and second image data record image data of the same objects in the environment and performs data compression where image data overlaps.

20. The data capture system of claim 15, wherein the first and second sensors comprise motion sensors that track relative motion.

* * * * *